(12) United States Patent
Zamora (10) Patent No.: US 11,009,333 B1
(45) Date of Patent: May 18, 2021

(54) TAPER GAUGE ASSEMBLY (71) Applicant: Marco Zamora, Edinburg, TX (US)

(72) Inventor: Marco Zamora, Edinburg, TX (US)

(*) Notice: Subject to any disclaimer, the term of this patent is extended or adjusted under 35 U.S.C. 154(b) by 0 days.

(21) Appl. No.: 16/710,858

(22) Filed: Dec. 11, 2019

(51) Int. Cl.
G01B 3/56 (2006.01)

(52) U.S. Cl.
CPC ................................ G01B 3/56 (2013.01)

(58) Field of Classification Search
CPC .................................................. G01B 3/56
USPC .......................................................... 33/531
See application file for complete search history.

(56) References Cited

U.S. PATENT DOCUMENTS

| | | | |
|---|---|---|---|
| D987,703 | | 3/1911 | Curtin |
| 2,114,936 A | * | 4/1938 | Pilnick ................ G01B 3/40 33/829 |
| 4,498,239 A | | 2/1985 | Epstein |
| 4,637,142 A | | 1/1987 | Baker |
| 4,888,876 A | * | 12/1989 | Meredith .............. G01B 3/30 33/501.08 |
| 4,959,014 A | * | 9/1990 | Sheridan ............. A61C 19/04 33/514 |
| 4,964,222 A | * | 10/1990 | Keener ................. G01B 3/30 29/8 |
| 5,042,161 A | * | 8/1991 | Hodge ................ A61F 2/2496 33/501.45 |
| 5,199,180 A | * | 4/1993 | Yablonsky ............ G01B 3/30 33/501.45 |
| 5,471,748 A | * | 12/1995 | Provost ................ A63B 53/14 30/289 |
| 5,604,989 A | * | 2/1997 | Stevenson ............ G01B 3/46 33/506 |
| 5,799,408 A | * | 9/1998 | Sprayberry ......... B25B 27/16 29/271 |
| D411,808 S | * | 7/1999 | Irwin ........................ D10/65 |
| 6,481,114 B1 | * | 11/2002 | Kalajian ............... A44C 9/02 33/512 |
| 7,188,430 B2 | * | 3/2007 | Tange ................. G01B 3/306 33/501.45 |
| 7,607,237 B2 | | 10/2009 | Schafer |
| 9,250,052 B2 | | 2/2016 | Patynchuk |
| 9,494,402 B2 | | 11/2016 | Livitski |
| 10,046,456 B2 | * | 8/2018 | Byrt ..................... G01B 3/30 |
| 10,612,902 B2 | * | 4/2020 | Granville ............. G01B 3/04 |
| 2004/0083618 A1 | * | 5/2004 | Kelly ................... G01B 3/30 33/544.4 |

(Continued)

FOREIGN PATENT DOCUMENTS

EP          0039582          11/1981

Primary Examiner — Yaritza Guadalupe-McCall (57) ABSTRACT

A taper gauge assembly includes a plurality of gauges that each has a flat side and a tapered side. Each of the gauges has ruler indicia printed thereon for indicating the width of the gauges along a full length of the gauges. A selected one of the gauges is insertable into a gap between a reference fixture and an assembled part in a manufacturing setting. Moreover, the selected gauge is inserted downwardly until the flat side abuts a perimeter edge of the reference fixture and the tapered side abuts a perimeter edge of the assembled part. Thus, the perimeter edge the reference fixture and the perimeter edge of the assembled part is aligned with a respective point along the ruler indicia. In this way an inspection distance is defined between the reference fixture and the assembled part for performing a quality inspection.

5 Claims, 6 Drawing Sheets (56) References Cited

U.S. PATENT DOCUMENTS

2009/0031574 A1* 2/2009 Waltz, Jr. ............... G01B 5/213
33/555.3
2017/0227344 A1 8/2017 Rettig

* cited by examiner

TAPER GAUGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to gauge devices and more particularly pertains to a new gauge device for performing quality inspections in a manufacturing environment.

(2) Description of Related Art Including Information Disclosed Under 37 CFR 1.97 and 1.98

The prior art relates to gauge devices.

BRIEF SUMMARY OF THE INVENTION

An embodiment of the disclosure meets the needs presented above by generally comprising a plurality of gauges that each has a flat side and a tapered side. Each of the gauges has ruler indicia printed thereon for indicating the width of the gauges along a full length of the gauges. A selected one of the gauges is insertable into a gap between a reference fixture and an assembled part in a manufacturing setting. Moreover, the selected gauge is inserted downwardly until the flat side abuts a perimeter edge of the reference fixture and the tapered side abuts a perimeter edge of the assembled part. Thus, the perimeter edge the reference fixture and the perimeter edge the assembled part is aligned with a respective point along the ruler indicia. In this way an inspection distance is defined between the reference fixture and the assembled part for performing a quality inspection.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new gauge device embodying the principles and concepts of an embodiment of the disclosure and generally designated by the reference numeral 10 will be described.

As best illustrated in FIGS. 1 through 7, the taper gauge assembly 10 generally comprises a plurality of gauges 12 that each has a flat side 14 and a tapered side 16. Additionally, each of the gauges 12 increases in width along a longitudinal axis. Each of the gauges 12 has ruler indicia 18 printed thereon for indicating the width of the gauges 12 between the tapered side 16 and the flat side 14. Moreover, each of the gauges 12 has an average width that is discrete from one another.

Figure 1:
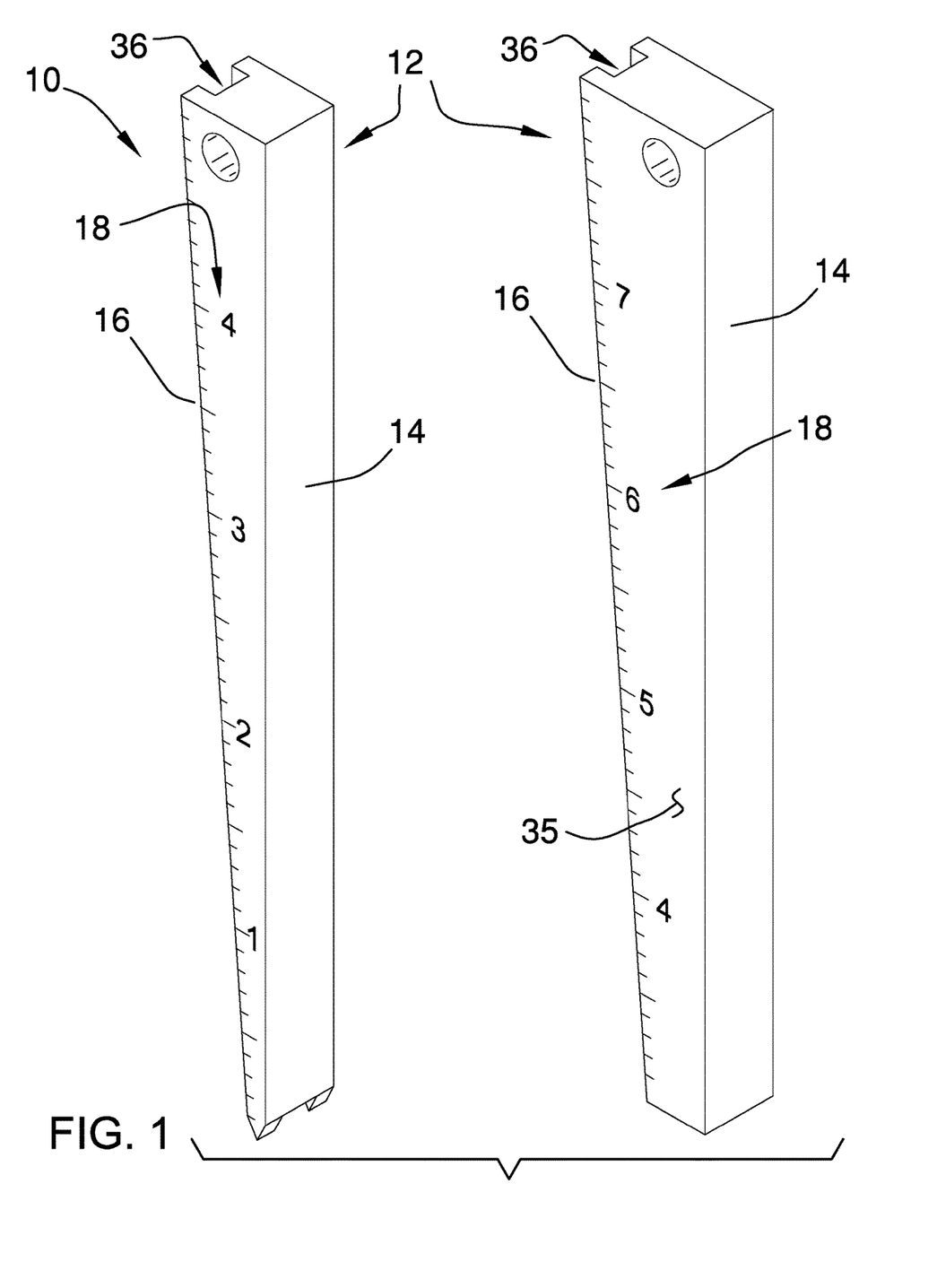
FIG. 1 is a front perspective view of a taper gauge assembly according to an embodiment of the disclosure.
Figure 2:
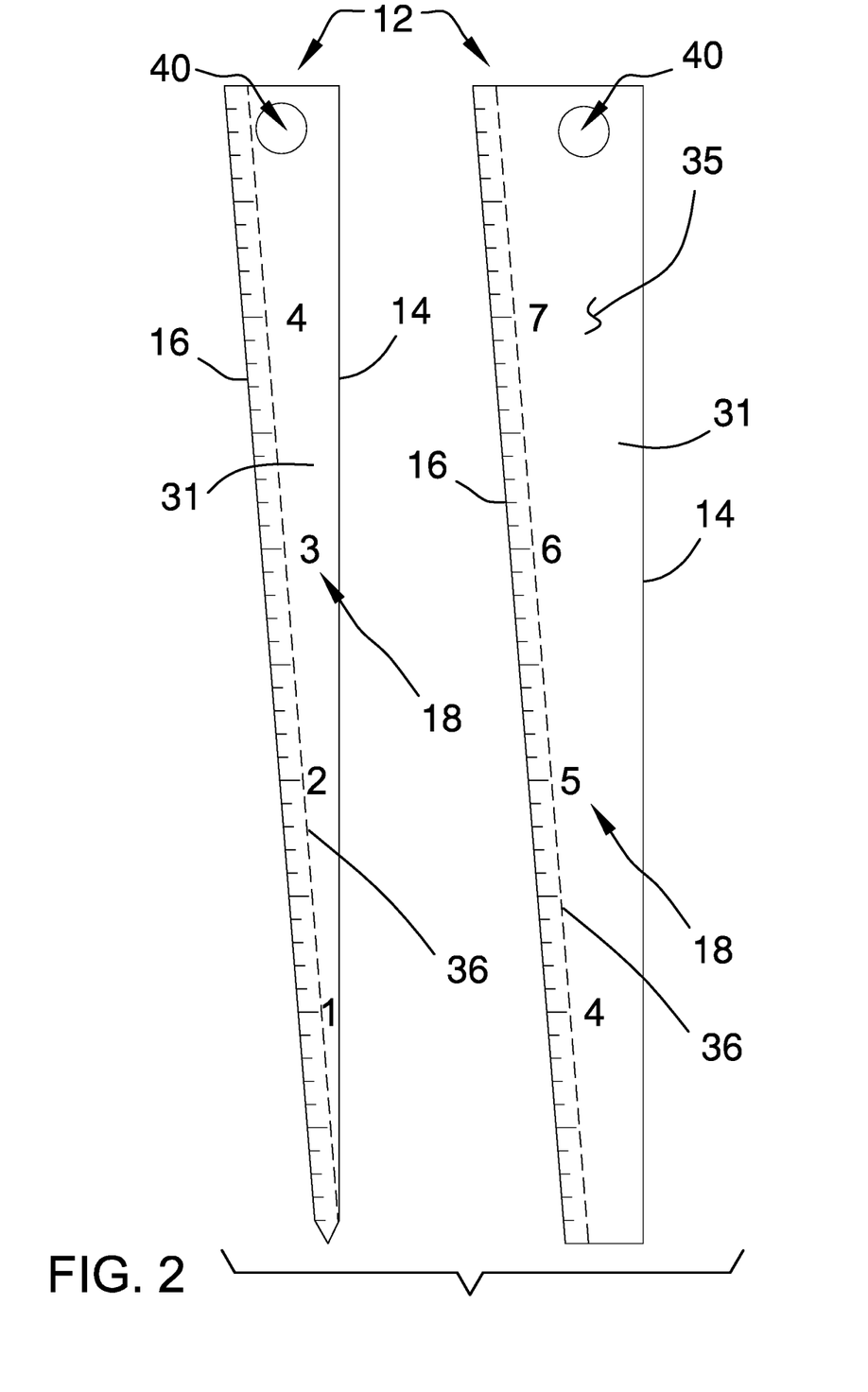
FIG. 2 is a front phantom view of an embodiment of the disclosure.
Figure 3:
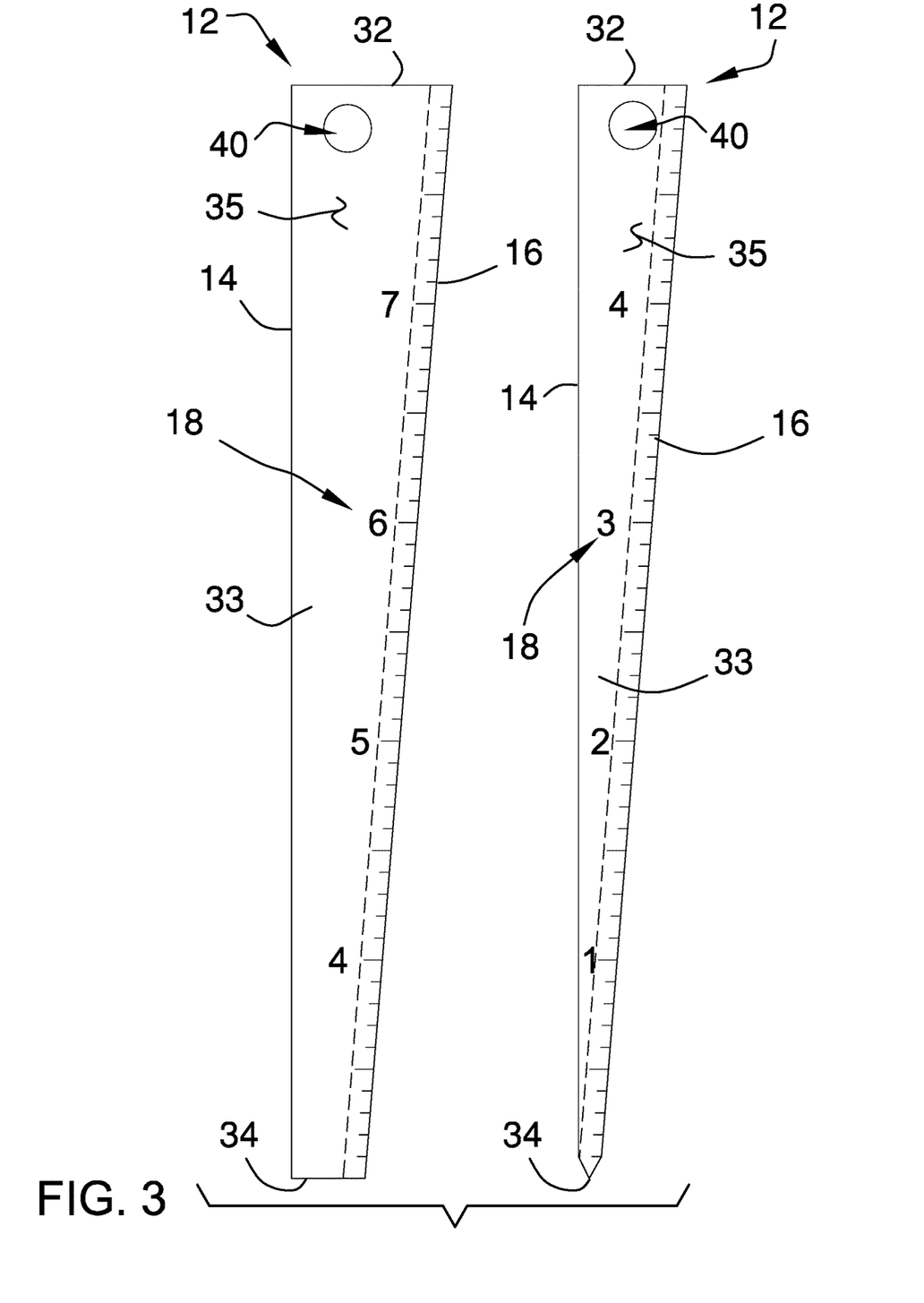
FIG. 3 is a back phantom view of an embodiment of the disclosure.
Figure 4:
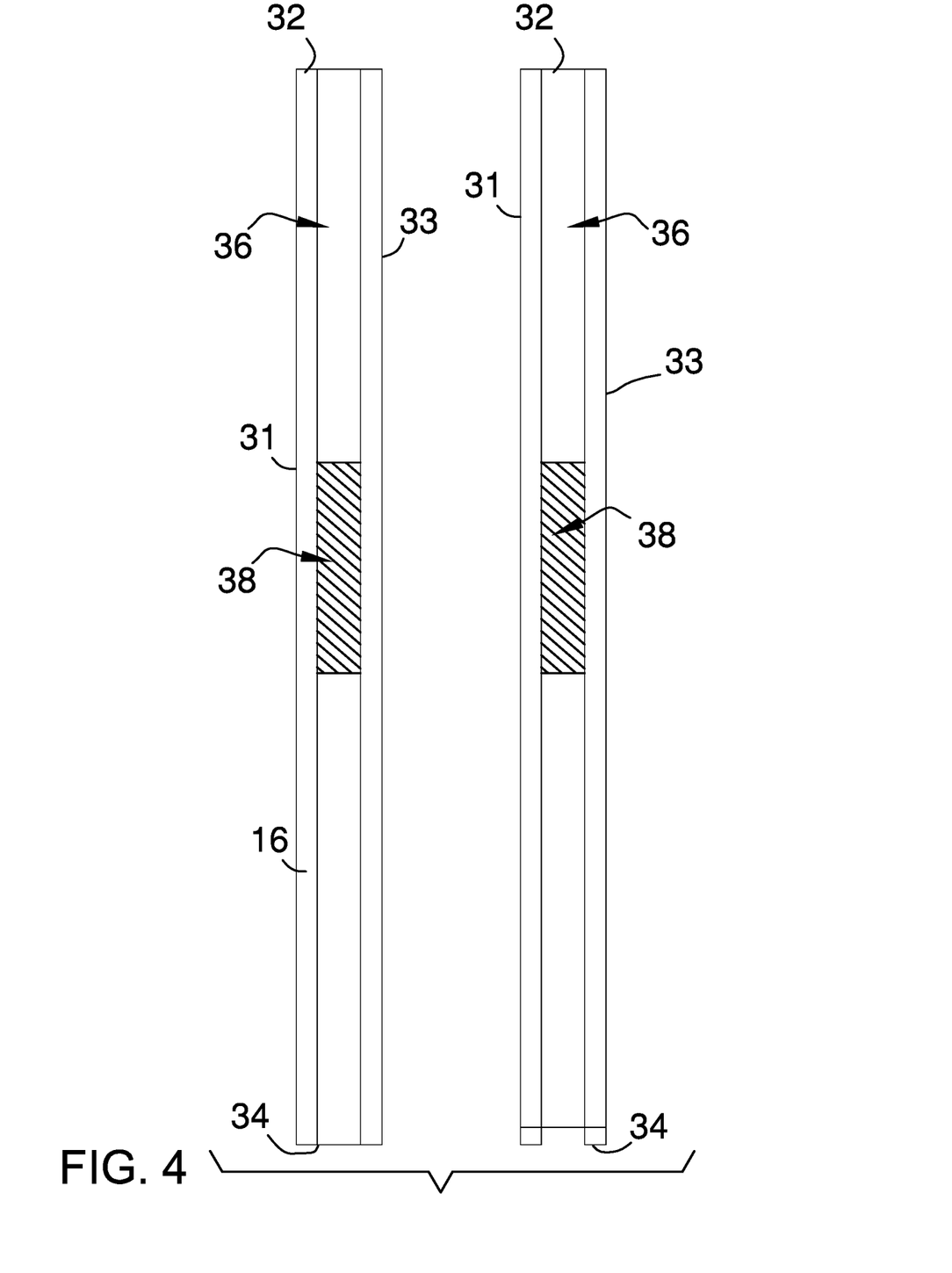
FIG. 4 is a right side view of an embodiment of the disclosure.
Figure 5:
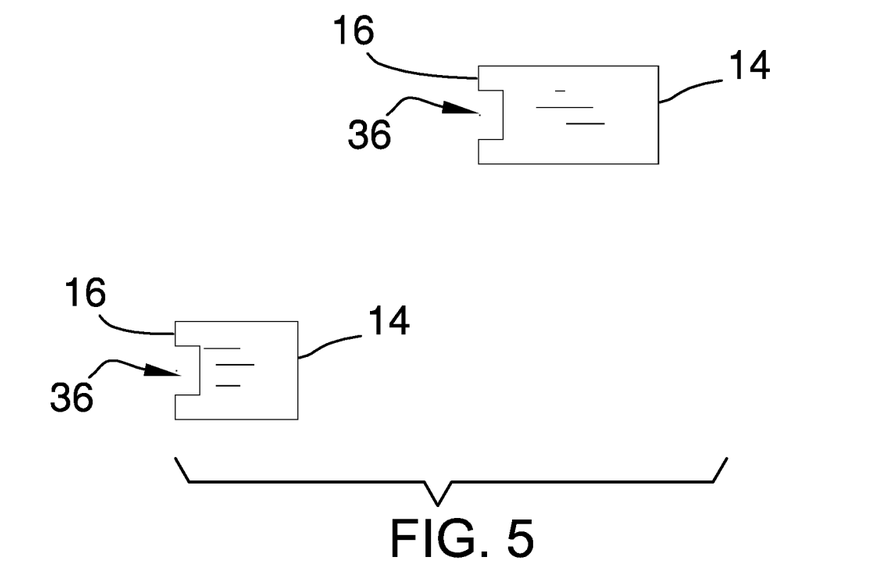
FIG. 5 is a top view of an embodiment of the disclosure.
Figure 6:
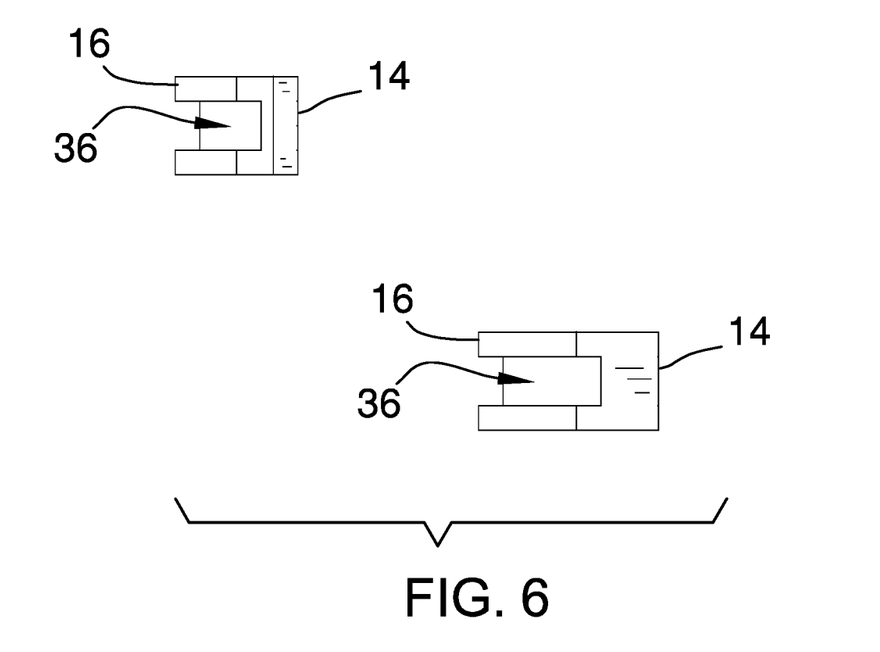
FIG. 6 is a bottom view of an embodiment of the disclosure.
Figure 7:
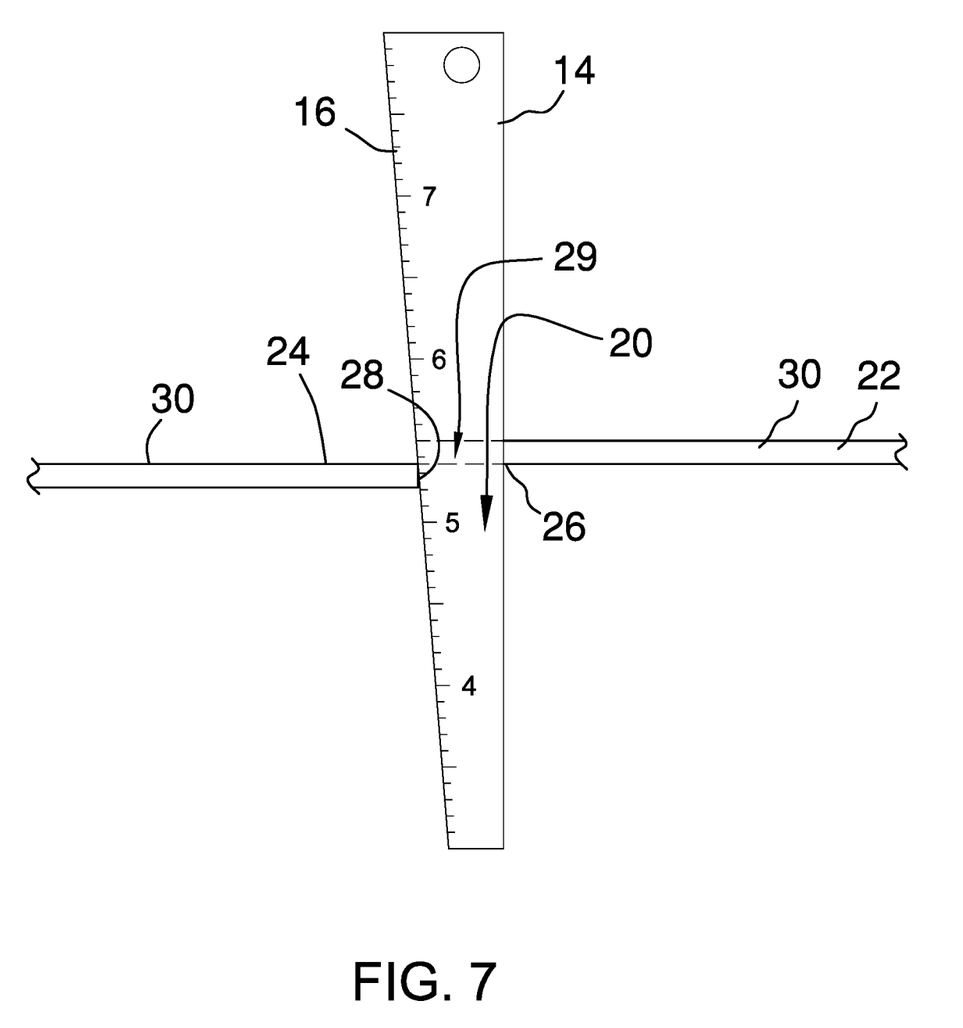
FIG. 7 is a perspective in-use view of an embodiment of the disclosure.

A selected one of the gauges 12 is insertable into a gap 20 between a reference fixture 22 and an assembled part 24 in a manufacturing setting. The manufacturing setting may be an automotive assembly plant or other similar type of manufacturing setting. The selected gauge 12 is inserted downwardly until the flat side 14 abuts a perimeter edge 26 of the reference fixture 22 and the tapered side 16 abuts a perimeter edge 28 of the assembled part 24. Thus, an inspection distance 29 is defined between the reference fixture 22 and the assembled part 24 for performing a quality inspection.

Each of the gauges 12 has a first end 32, a second end 34 and an outer surface 35 extending therebetween, and each of the gauges 12 is elongated between the first end 32 and the second end 34. The outer surface 35 includes a front side 31, a back side 33, the tapered side 16 and the flat side 14. Each of the front side 31 and the back side 33 extends between the flat side 14 and the tapered side 16 such that each of the gauges 12 has a rectangular cross section taken along an axis extending through the first end 32 and the second end 34.

The ruler indicia 18 are positioned on the front side 31 and the back side 33, and the ruler indicia 18 extends between the first end 32 and the second end 34. Additionally, each point along the ruler indicia 18 indicates the width between the tapered side 16 and the flat side 14. The tapered side 16 angles inwardly between the first end 32 and the second end 34 such that each of the gauges 12 has a decreasing width between the first end 32 and the second end 34. The tapered side 16 has a groove 36 extending toward the flat side 14, and the groove 36 extends between the first end 32 and the second end 34.

The groove 36 has a verification portion 38 and the verification portion 38 is positioned to extend between pre-determined points on the ruler indicia 18. The pre-determined points are chosen based on tolerances for passing the quality inspection. Additionally, the verification portion 38 has a distinct color with respect to the groove 36. In this way the verification portion 38 is visible to a user during the quality inspection. Additionally, each of the gauges 12 has a hole 40 extending through the front side and the back side of the outer surface for receiving a holder. The hole 40 is positioned adjacent to an intersection between the flat side 14 and the first end 32.

In use, the selected gauge 12 for the inspection is chosen based upon the width of the gap 20 between the reference fixture 22 and the assembled part 24. The second end 34 of the selected gauge 12 is inserted between the reference fixture 22 and the assembled part 24 until the flat side 14 abuts the reference fixture 22 and the tapered side 16 abuts the assembled part 24. The ruler indicia 18 are observed to determine the inspection distance between the perimeter edge 26 of the reference fixture 22 and the perimeter edge 28 of the assembled part 24.

The quality inspection can be considered "passed" if the perimeter edge 26 of the reference fixture 22 and the perimeter edge 28 the assembled part 24 are positioned within the verification portion 38 of the groove 36. In this way a quality inspection is performed with respect verifying pre-determined tolerances between the reference fixture and the assembled part. The current method of performing weld inspections involves the use of a ball gauge or a feeler gauge, which requires guess work on the part of the user for measuring the inspection distance. This is both time consuming and potentially inaccurate. In the case of a ball gauge, an incorrect diameter of ball gauge may be mistakenly employed for measuring the inspection distance. In the case of a feeler gauge, a undersized stack of feeler gauges may be employed for measuring the inspection distance. In either case, the inspection distance could easily be measured inaccurately. The disclosed assembly facilitates the inspection distance 29 to be measured without guess work and in a timely fashion.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A taper gauge assembly being configured to measure a gap between assembled automotive components during quality inspection, said assembly comprising:
   a plurality of gauges, each of said gauges having a flat side and a tapered side, each of said gauges increasing in width along a longitudinal axis, each of said gauges having ruler indicia being printed thereon for indicating the width of said gauges along a full length of said gauges, each of said gauges having an average width being discrete from one another, a selected one of said gauges being insertable into a gap between a reference fixture and an assembled part in a manufacturing setting, said selected gauge being inserted downwardly until said flat side abuts a perimeter edge of said reference fixture and said tapered side abuts a perimeter edge of said assembled part, a perimeter edge of each of said reference fixture and said assembled part being aligned with a respective point along said ruler indicia to define an inspection distance between said reference fixture and said assembled part for performing a quality inspection;
   wherein each of said gauges has a first end, a second end and an outer surface extending therebetween, each of said gauges being elongated between said first end and said second end, said outer surface including a front side, a back side, said tapered side and said flat side, each of said front side and said back side extending between said flat side and said tapered side such that each of said gauges has a rectangular cross section taken along an axis extending through said first end and said second end;
   wherein said ruler indicia is positioned on said front side, said ruler indicia extending between said first end and said second end; and
   wherein said tapered side angles inwardly between said first end and said second end such that each of said gauges has a decreasing width between said first end and said second end, said tapered side having a groove extending toward said flat side, said groove extending between said first end and said second end.

2. The assembly according to claim 1, wherein said groove has a verification portion, said verification portion being positioned to extend between pre-determined points on said ruler indicia, said verification portion having a distinct color with respect to said groove wherein said verification portion is configured to be visible to a user during the quality inspection.

3. The assembly according to claim 2, wherein said second end of said selected gauge being insertable into said gap between said reference fixture and said assembled part for performing the quality inspection.

4. The assembly according to claim 1, wherein each of said gauges has a hole extending through said front side and said back side of said outer surface wherein said hole is configured to receive a holder, said hole being positioned adjacent to an intersection between said flat side and said first end.

5. A taper gauge assembly being configured to measure a gap between assembled automotive components during quality inspection, said assembly comprising:

a plurality of gauges, each of said gauges having a flat side and a tapered side, each of said gauges increasing in width along a longitudinal axis, each of said gauges having ruler indicia being printed thereon for indicating the width of said gauges along a full length of said gauges, each of said gauges having an average width being discrete from one another, a selected one of said gauges being insertable into a gap between a reference fixture and an assembled part in a manufacturing setting, said selected gauge being inserted downwardly until said flat side abuts a perimeter edge of said reference fixture and said tapered side abuts a perimeter edge of said assembled part, said perimeter edge of each of said reference fixture and said assembled part being aligned with a respective point along said ruler indicia to define an inspection distance between said reference fixture and said assembled part for performing a quality inspection, each of said gauges having a first end, a second end and an outer surface extending therebetween, each of said gauges being elongated between said first end and said second end, said outer surface including a front side, a back side, said tapered side and said flat side, each of said front side and said back side extending between said flat side and said tapered side such that each of said gauges has a rectangular cross section taken along an axis extending through said first end and said second end, said ruler indicia being positioned on said front side, said ruler indicia extending between said first end and said second end, said tapered side angling inwardly between said first end and said second end such that each of said gauges has a decreasing width between said first end and said second end, said tapered side having a groove extending toward said flat side, said groove extending between said first end and said second end, said groove having a verification portion, said verification portion being positioned to extend between pre-determined points on said ruler indicia, said verification portion having a distinct color with respect to said groove wherein said verification portion is configured to be visible to a user during the quality inspection, said second end of said selected gauge being insertable into said gap between said reference fixture and said assembled part for performing the quality inspection, each of said gauges having a hole extending through said front side and said back side of said outer surface wherein said hole is configured to receive a holder, said hole being positioned adjacent to an intersection between said flat side and said first end.

* * * * *